Patented Sept. 8, 1953

2,651,589

UNITED STATES PATENT OFFICE 2,651,589

PROCESS FOR FORMING CURED GLYCIDYL ETHER RESINOUS BONDS BETWEEN TWO SOLID SURFACES

Edward C. Shokal, Walnut Creek, Herbert A. Newey, Richmond, and Theodore F. Bradley, Oakland, Calif., assignors to Shell Development Company, San Francisco, Calif., a corporation of Delaware No Drawing. Application October 25, 1949, Serial No. 123,528

21 Claims. (Cl. 154—140)

This invention relates to a method of curing glycidyl ethers having 1,2-epoxy equivalency greater than one to useful resinous substances.

Glycidyl ethers having 1,2-epoxy equivalency greater than one obtained, for example, by reacting a dihydric phenol with epichlorhydrin in an alkaline medium have heretofore been cured to hard resinous products by heating with an acid- or basic-acting hardening agent such as a polycarboxylic acid or a diamine. While such hardening agents effect excellent cures of the glycidyl ethers, the feasibility of their use on a commercial basis is not very satisfactory. This is particularly true with the diamines which have obnoxious odors that are offensive to workers.

These difficulties are overcome with the present invention by using as curing agent a preformed reaction product of a glycidyl ether having a 1,2-epoxy equivalency greater than one with at least 90% of one molecular weight of hardening agent for each epoxy group of the ether initially present in the reaction mixture, the hardening agent containing a plurality of neutralizable hydrogen atoms and having a dissociation constant in 0.01 N aqueous solution greater than $10^{-6}$. Unlike the reaction product of customary equivalent quantities of the glycidyl ether and the hardening agent which is insoluble and incompatible with addition quantities of glycidyl ether, the preformed reaction product is soluble in various organic solvents as well as being homogeneously compatible with further quantities of the resin-forming glycidyl ether. It is devoid of the foul and obnoxious odor even when diamines are used in its preparation and thus obviates use of fume removal machinery in application as a curing agent. Moreover, it has equal ability as a curing agent for the glycidyl ethers.

The epoxy ethers employed in the composition of the invention contain, along with the ethereal oxygen, glycidyl groups in such quantity that the material has a 1,2-epoxy equivalency which is greater than one. By the epoxy equivalency reference is made to the average number of 1,2-epoxy groups

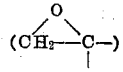

contained in the average molecule of the ether. In the case where a substantially pure simple compound is used, the epoxy equivalency will be an integer of two or more. For example, the epoxy equivalency of diglycidyl ether or of the diglycidyl ether of ethylene glycol is two, while that of triglycidyl ether of glycerol is three. However, the glycidyl ether may be a mixture of chemical compounds which, although they are of similar identity and chemical constitution, have different molecular weights. The measured molecular weight of the mixture upon which the epoxy equivalency is dependent will necessarily be an average. Consequently, the epoxy equivalency of the glycidyl ether mixture will not necessarily be an integer of two or more but will be a value which is greater than one. For example, a glycidyl ether particularly suitable for use in the invention is that made by reacting bis-(4-hydroxyphenyl)-2,2-propane with epichlorhydrin in the presence of an alkali at a mole ratio of about 1.4 mols of epichlorhydrin per mol of the dihydric phenol. The product is a solid resinous mixture of glycidyl ethers for a measured average of molecular weight of 791. Analysis shows the product to contain about 0.169 equivalent of epoxy groups per 100 grams. Consequently, the product has an epoxy equivalency of about 1.34, i. e. an average of about 1.34 epoxy groups per molecule.

The glycidyl ethers used in the invention preferably contain only the elements carbon, hydrogen and oxygen. They include 1,2-epoxy-containing polyethers of polyhydric alcohols such as polyglycidyl ethers thereof like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one such as the polyglycidyl ethers of glycol, diglycerol, erythritol, pentaglycerol, mannitol, sorbitol, polyallyl alcohol, polyvinyl alcohol, and the like. The polyglycidyl polyethers of the polyhydric alcohols are prepared by reacting the polyhydric alcohol with epichlorhydrin in the presence of about 0.1 to 2% of an acid-acting catalyst such as boron trifluoride, hydrofluoric acid or stannic chloride, whereby the chlorhydrin ether is formed as product. The reaction is effected at about 50 to 125° C. with the proportions of reactants being such that there is about 1 mol of epichlorhydrin for each molecular equivalent of hydroxyl group in the polyhydric alcohol. Thus, in preparing the ether of glycerol, which polyhydric alcohol contains three hydroxyl groups in each mol thereof, about three mols of epichlorhydrin for each mol of glycerol are used. The resulting glycidyl ether from the reaction of a polyhydric alcohol with epichlorhydrin is then dehydrochlorinated by heating at about 50 to 125° C.

with a small, say 10%, stoichiometrical excess of a base. For this purpose, sodium aluminate gives good results.

A preferred group of epoxy ethers for use in the invention is prepared by reacting a dihydric phenol with epichlorhydrin in alkaline solution. These products are of resinous character and in general are solid materials at normal temperature (20.30° C.). Any of the various dihydric phenols are used in preparing these glycidyl ethers including mononuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are prepared by heating at 50 to 150° C. the dihydric phenol with epichlorhydrin using 1 to 2 or more mols of epichlorhydrin per mol of dihydric phenol. Also present is a base such as sodium, potassium, calcium or barium hydroxide in amount of about 10 to 30% stoichiometric excess of the epichlorhydrin, e. g. 1.1 to 1.3 equivalents of base per mol of epichlorhydrin. In effecting the reaction, the dihydric phenol is mixed with an aqueous solution of the base and heated. The epichlorhydrin is then added rapidly to the stirred reaction mass. The initial reaction is somewhat exothermic so that the temperature will rise to some extent, but then heating is applied while stirring whereupon the taffy-like resinous polyether forms. While still hot, the reaction product is washed with water until free of base.

The resulting resinous polyether is a complex mixture rather than being a single chemical compound. The principal product may be represented by the formula

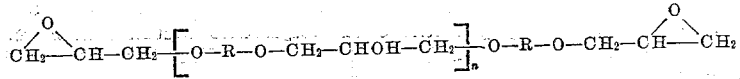

wherein $n$ is an integer preferably of 1 to 7 such as 4 and R represents the divalent hydrocarbon radical of the dihydric phenol. The length of the chain (the value of $n$) can be made to vary by changing the molecular proportions of epichlorhydrin to dihydric phenol in preparing the epoxy ether. Thus, by decreasing the mols of epichlorhydrin per mol of dihydric phenol from about 2 downwards toward 1, the molecular weight, the softening point and the epoxy equivalency are increased. In general, these glycidyl ethers having epoxy equivalency between 1 and 2 contain terminal 1,2-epoxy groups and have alternate aliphatic and aromatic groups linked together by ethereal oxygen atoms.

The following examples illustrate preparation of typical glycidyl ethers employed in the invention, wherein the parts are by weight.

Example I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20 to 30° C. temperature was started 30 minutes later and continued for 4½ hours. The product was dried by heating to a final temperature of 140° C. in 80 minutes, and cooled rapidly. At room temperature, the product was an extremely viscous, semi-solid having a melting point of 27° C. by Durran's Mercury Method and an epoxide equivalent weight of 249. For convenience this product will be referred to hereinafter as Epoxy Resin I.

Example II

Instead of using 2.6 mols of epichlorhydrin per mol of bis-phenol as described in the above example, there was employed only 2.04 mols of epichlorhydrin per mol of bis-phenol. About 798 parts of bis-phenol were dissolved in a caustic soda solution made by dissolving 200 parts of sodium hydroxide in 1730 parts of water in a stainless steel closed kettle. Epichlorhydrin in amount of 660 parts was then added in one portion to the closed kettle, the mixture being stirred during the addition. The temperature rose from 37° C. to 70° C. in 45 minutes. Caustic soda, 80 parts in 200 parts of water, was then added whereupon the temperature rose to about 82° C. during a further 30 minutes. Additional caustic soda, 29 parts in 100 parts of water, was then added and the kettle contents were heated. The temperature of the reaction mixture was gradually increased to about 95° C. in approximately 30 minutes. The aqueous liquor was next drawn off from the taffy-like product which had formed. The latter was washed with hot water while agitated and a series of washing treatments applied until the water was neutral to litmus. The product was then dried by heating to a final temperature of 130° C. and removed from the kettle. The softening point of the resulting glycidyl ether was 43° C. by Durran's Mercury Method and it had an epoxy value of 0.326 equivalent per 100 grams. The average molecular weight measured ebullioscopically in ethylene dichloride was 510. This product will be known hereinafter as Epoxy Resin II.

Example III

Another glycidyl ether was prepared using 2.0 mols of epichlorhydrin per mol of bisphenol. A solution of 257 parts of sodium hydroxide was dissolved in 2310 parts of water and 652 parts of bisphenol was added thereto. The resulting solution was agitated and heated to about 46° C. whereupon 530 parts of epichlorhydrin were added. The temperature rose to about 93° C. in 50 minutes and was maintained at 93° C. to 95° C. for an additional 30 minutes. The mother liquor was then drained from the taffy-like reaction product which was next rinsed continuously with hot water until the effluent was neutral to litmus. The water was drained from the product which was dried by heating up to a temperature of about 140° C. and the reaction product was removed from the reaction kettle while liquid. The resulting glycidyl ether had a softening point by Durran's Mercury Method of 48° C. The epoxy value of the ether was 0.287 equivalent per 100 grams. This product will be known hereinafter as Epoxy Resin III.

Example IV

A further glycidyl ether was prepared in the same manner as described in the above examples using a ratio of 1.25 mols of epichlorhydrin per mol of bisphenol and 1.3 mols of sodium hydroxide per mol of epichlorhydrin. The product had a Durran Mercury Method melting point of 100° C. and an epoxy value of 0.116 equivalents of epoxy per 100 grams. The molecular weight measured ebullioscopically in dioxane solution was 1133. The resulting product will be known hereinafter as Epoxy Resin IV.

The glycidyl ethers of a polyhydric phenol employed as principal resinifying constituent in the composition have a 1,2-epoxy equivalency greater than one, and is usually between one and two. The 1,2-epoxy equivalency is the value obtained upon dividing the average molecular weight of the ether by the epoxide equivalent weight thereof. Thus, the epoxy equivalency of Epoxy Resin II was 1.57.

The epoxide equivalent weight of the glycidyl ethers of polyhydric phenols is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

Preparation of the polyglycidyl ethers of polyhydric alcohols may be illustrated by considering preparation of the polyglycidyl ether of glycerol.

Example V

About 276 parts of glycerol (3 mols) were mixed with 828 parts of epichlorhydrin (9 mols). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule. For convenience, this product will be known as "Epoxy Resin V."

The preformed reaction product employed as curing agent in the invention is prepared by mixing and allowing to react a glycidyl ether having a 1,2-epoxy equivalency greater than one with at least 90% of one molecular weight of a hardening agent for each epoxy group of the ether initially present in the reaction mixture. In general, it is preferred to effect the reaction while heating the reaction mixture at a temperature from about 50° C. to 150° C. It is also preferred to effect the reaction in a solution employing a neutral inert organic solvent for the reactants and product. Dioxane is particularly useful for this purpose since it possesses the desired solvent characteristics and the formed product may be readily separated therefrom as a precipitate upon addition of water to the solution.

The hardening agent used in preparing the preformed reaction product is a compound containing a plurality of neutralizable hydrogen atoms which has a dissociation constant in 0.01 N aqueous solution at 20° C. greater than $10^{-6}$. The compound contains a plurality of neutralizable hydrogen atoms and thus may be of either acidic or basic character. Compounds such as calcium hydroxide contain neutralizable hydroxyl groups, but not neutralizable hydrogen atoms and, consequently, are not suitable for the purpose intended.

Suitable acidic compounds are exemplified by such substances as phosphoric acid, phosphorus acid, butyl dihydrogen orthophosphate, phenyl dihydrogen orthophosphate, sulfuric acid, oxalic acid, succinic acid, adipic acid, phthalic acid, tartaric acid, tricarbollylic acid, and the like. Among basic agents are polyamines, for example, like ethylene diamine, propylene diamine, N,N'-diethyl ethylene diamine, phenylene diamine, 2,4-diamino - 2 - methylpentane, 3,4 - diamino - 3,4-dimethylhexane, 2,7-diamino-2,7-dimethyloctane, and the like.

The most important detail which need be observed in preparing the preformed reaction product is use of proper percentages of the hardening agent with the glycidyl ether. It is preferred to employ one molecular weight of hardening agent for each epoxy group (oxirane group) of the ether. It is permissible to use down to about 90% of this amount and obtain the desired product, namely, a reaction product which is soluble in organic solvents such as dioxane and is homogeneous with additional amounts of the glycidyl ether. However, upon using lesser amounts of hardening agents, such as down to the point of an equivalent amount of hardening agent for each epoxy group, there is formed a cured product which is insoluble in organic solvents such as dioxane and is incompatible with additional glycidyl ether. The use of greater quantities of hardening agent than one molecular weight for each epoxy group has no appreciable effect on the product. When a large excess is employed, the bulk of that amount over the one molecular weight sample does not react and can be recovered.

In view of the critical character of the proportions, the order of addition in preparing the preformed reaction product is important. By adding the glycidyl ether to the desired quantity of hardening agent with agitation, local regions in the reaction mixture where the proportion of hardening agent to ether is too low are avoided. Such a condition is likely to be encountered with the reverse order of addition.

The following examples are given for the purpose of illustrating preparation of the preformed reaction product used as curing agent in the process of the invention.

Example VI

The type of undesired product obtained when equivalent amounts of hardening agent are used will be illustrated in this example.

In a three-necked vessel 9.78 parts of ethylene diamine (0.163 mol) dissolved in 50 parts of dioxane were heated to 60° C. One hundred parts of Epoxy Resin II (epoxy value 0.326 equivalent per 100 grams) dissolved in 100 parts of dioxane were added. There was thus one equivalent or one-half mol of ethylene diamine for each equivalent of epoxy group. The mixture was heated at reflux temperature of 101° C. to 103° C. for 40 minutes at which time it gelled to a hard, rubbery mass. The gel was insoluble in acetone, methyl ethyl ketone, dioxane, chloroform, pyridine, n-butyl acetate, and methyl Cellosolve (monomethyl ether of ethylene glycol).

Example VII

The above example was repeated except that twice the quantity of ethylene diamine was used, namely, 19.56 parts (0.326 mol). There was thus one mol of ethylene diamine for each epoxy equivalent in the glycidyl ether. After heating this reaction mixture for 3 hours at 101° C. to 103° C. there was no sign of gellation. Moreover, the viscosity of the solution was not increased on standing at room temperature for 90 days. The product which was separated by running the dioxane solution into water was a brittle thermoplastic resin partly soluble in acetone and readily soluble in dioxane or a mixture of alcohol and toluene. The product contained 4.05% nitrogen and had a total basicity of 0.27 equivalent per 100 grams.

Example VIII

Another preformed reaction product was prepared by dissolving 0.66 mol of ethylene diamine in 50 parts of dioxane and heating the solution to 60° C. There were then added 100 parts of Epoxy Resin III dissolved in 100 parts of dioxane to the solution. The mixture was heated at reflux temperature for 3 hours' time and the product isolated by running the solution into water. In this manner, 90 parts of product were obtained. The preformed reaction product contained 4.80% nitrogen and had a total basicity of 0.33 equivalent per 100 grams when titrated with perchloric acid.

Example IX

In order to determine whether heating for a longer period of time significantly changed the character of the product, Example VIII was repeated except that the heating was continued for a period of 21 hours instead of 3 hours. The resulting product which amounted to 99 parts by weight contained 5.22% nitrogen and had a total basicity of 0.37 equivalent per 100 grams. It is therefore evident that the longer period of heating did not significantly change the character of the product which was likewise soluble in dioxane as was the product obtained as described in Example VIII.

Example X

In order to determine the effect of a large excess of hardening agent, Example VIII was repeated except that 2.0 mols of ethylene diamine were used instead of 0.66 mol. The resulting product amounting to 80 parts contained 5.50% nitrogen and had a total basicity of 0.39 equivalent per 100 grams. The product was likewise soluble in dioxane.

Example XI

A solution was prepared by dissolving 0.66 mol of 2,4-diamino-2-methylpentane in 50 parts of dioxane. The solution was heated to 60° C. and there were added 100 parts of Epoxy Resin III dissolved in 100 parts of dioxane. The mixture was heated at 101° C. to 103° C. for 3 hours after which the solution was run into water whereupon a brittle thermoplastic resin separated which was partly soluble in acetone and readily soluble in dioxane or in a mixture of equal parts by weight of ethyl alcohol and toluene. The product contained 5.43% nitrogen and had a total basicity of 0.39 equivalent per 100 grams upon titration with perchloric acid.

Example XII

A solution was prepared by dissolving 0.43 mol of diethylene triamine in 50 parts of dioxane. The solution was heated to 60° C. and 100 parts of Epoxy Resin III dissolved in 100 parts of dioxane were added thereto. The reaction mixture was heated at 101° C. to 103° C. for 20 hours and the resulting solution of product run into water to precipitate the same. In this manner there were obtained 92 parts of product which contained 6.74% nitrogen and had a total basicity of 0.40 equivalent per 100 grams.

Example XIII

A solution of 74 parts (1.23 mols) of ethylene diamine dissolved in 100 parts of dioxane was heated to 100° C. and 100 parts of Epoxy Resin V dissolved in 100 parts of dioxane were added thereto in 1½ hours. The mixture was refluxed for an additional 1½ hours and the product, upon cooling to room temperature, separated as a viscous, sticky, lower layer. To remove the excess diamine, the product was washed with dioxane and then stirred and heated with dioxane until free of amine. The product was heated further under reduced pressure to remove the last of the dioxane. The viscous, sticky product was soluble in methanol. The preformed reaction product contained 11.6% nitrogen and had a total basicity of 0.39 equivalent per 100 grams upon titration with perchloric acid.

Example XIV

A soluble preformed reaction product from phosphoric acid was prepared by dissolving 28 parts of 100% phosphoric acid (0.286 mol) in 100 parts of dioxane. A solution of 100 parts of Epoxy Resin III in 100 parts of dioxane was added to the phosphoric acid solution. The mixture was refluxed for 20 hours. The reaction mixture was evaporated to dryness under vacuum to remove the dioxane employed as solvent. The product was a brittle solid soluble in dioxane and in acetone but insoluble in benzene and in n-butyl acetate. The product contained 7.0% phosphorus and the acidity was 0.43 equivalent per 100 grams upon titration in isopropyl alcohol using phenolphthalein as an indicator.

Example XV

A solution of 0.38 mol of oxalic acid dissolved in 100 parts of dioxane was heated to 100° C. To this solution were added 100 parts of Epoxy Resin III dissolved in 100 parts of dioxane. The reaction mixture was refluxed at 101° C. to 103° C. for 22 hours and the product separated from any excess oxalic acid by running into water and washing repeatedly. The product was a brittle solid soluble in acetone and in dioxane. The acidity using phenolphthalein as an indicator was 0.11 equivalent per 100 grams.

All of the preformed reaction products prepared as described in the foregoing examples were excellent curing agents for additional quantities of the glycidyl ether, whether the ether was the same or different. The use of some of these preformed reaction products as curing agents is illustrated in the following examples.

*Example XVI*

A 50% by weight solution of the preformed reaction product of Example IX (the ethylene diamine product) in methyl Cellosolve (monomethyl ether of ethylene glycol) was prepared. Another solution containing 50% by weight of Epoxy Resin III in methyl Cellosolve was prepared and mixed with an equal part by weight of the first solution. The mixture was coated on a glass panel and baked for one hour at 50° C. The resulting cured film was hard and tough. It was not softened or dissolved when contacted for 15 minutes with acetone or with dioxane.

*Example XVII*

A 47% dioxane solution of the preformed reaction product of Example XIV (the phosphoric acid product) was prepared and mixed with an equal part by weight of a 50% solution of Epoxy Resin III in methyl Cellosolve. The mixture was coated on a glass panel and baked at 150° C. for one hour. The resulting film was likewise hard, tough and well cured. It did not dissolve or soften after 15 minutes' contact with acetone or with dioxane.

*Example XVIII*

Example XVII was repeated except that the preformed reaction product of Example XII (the diethylene triamine product) was used. The resulting film was also hard and tough, and resistant to the action of solvents.

*Example XIX*

A 50% solution containing 10.25 parts of Epoxy Resin IV in equal parts by weight of xylene and methyl Cellosolve acetate (monomethyl ether of ethylene glycol monoacetate) was prepared. Another solution containing 3.5 parts of the preformed reaction product of Example XIV (the phosphoric acid product) as a 50% solution in dioxane was mixed with the first. The mixture was coated onto the surface of a glass panel and baked at 200° C. for 30 minutes. The resulting film of 0.8 mil thickness was tough, adherent and resistant to attack by organic solvents.

*Example XX*

Example XIX was repeated except that the amount of preformed reaction product amounted to one-half the weight of the epoxy resin. The resulting film was likewise tough and adherent as well as being resistant to the action of organic solvents such as acetone or dioxane.

In using the preformed reaction products as curing agents for the glycidyl ethers having a 1,2-epoxy equivalency greater than one, the desired curing may be effected by merely mixing the two substances and allowing them to react at ordinary atmospheric temperature of about 15 to 40° C. In general, however, it is desired to shorten the time for curing by use of a more elevated temperature such as a baking temperature of from about 50 to 250° C. Baking at about 125 to 200° C. is particularly suitable.

The proportion of preformed reaction product to the glycidyl ether desired to be cured may be varied to considerable extent. In general, it is desired to employ about equal weights of the two substances. However, this may be varied somewhat and good results can be obtained even at the extremes of the range amounting to about 50% to 150% of an equal weight of preformed reaction product with the glycidyl ether.

The invention contemplates use primarily of a preformed reaction product from a bifunctional hardening agent such as a diamine having the two primary amino groups or a dicarboxylic acid. In preparing the preformed product, the reaction may be considered to have consumed one of these groups of the hardening agent and the other remains free or uncombined in the preformed product. The free groups are thus available for reaction with additional glycidyl ether subjected to curing. If desired, the amount of glycidyl ether which is to be cured by a given quantity of preformed reaction product may be proportioned on the basis of the free reactive groups contained in the preformed reaction product and derived originally from the hardening agent. For this purpose, there would be used such a proportion that there is a free reactive group for each 1,2-epoxy group in the glycidyl ether, i. e., chemically equivalent amounts of the two substances. Here again some variation is permissible such as 50% on either side of the equivalent proportion. In general, however, the weight proportions described above are satisfactorily workable and more practicable.

It is not necessary to have used the same glycidyl ether in preparing the preformed reaction product as the glycidyl ether desired to be cured. Different glycidyl ethers may be used, which fact is illustrated in the foregoing examples. Moreover, the material to be cured may itself constitute a mixture of different glycidyl ethers. It is only necessary that the material being cured by the process of the invention be a glycidyl ether having a 1,2-epoxy equivalency greater than one, the nature and character of which materials have been described in some detail hereinbefore. An excellent use for the invention is in forming protective surface coating films. In using the compositions for this purpose, they may, of course, contain other desired ingredients such as solvents, pigments, plasticizers, other resins and the like. In general, the films are particularly suitable for surface coating purposes because of their excellent adhesion, toughness and resistance to solvents.

Another apparently unique application for the invention is for adhesive purposes. In this use, the preformed reaction product is coated on a uniting surface of one article and the glycidyl ether on the uniting surface of another article. Upon bringing the two coated surfaces together, especially with application of heat and at least contact pressure up to 500 pounds per square inch, a cured resin composition is obtained which binds the uniting surfaces of the two articles together. Since the two coated surfaces do not react until contacted with one another, numerous particles, particularly sheeting, coated with only one of the ingredients may be stored, stacked and contacted without danger of premature curing occurring.

Various materials with solid surfaces of the most diverse nature may be adhesively united in this manner such as wood-to-wood, wood-to-plastic, metal-to-metal, metal-to-glass, paper-to-wood, cloth-to-wood, paper-to-paper, paper-to-cloth, cloth-to-cloth, etc. Details of the method are illustrated in the following example:

*Example XXI*

The articles united were smooth-surfaced aluminum blocks. To the surface of one block was applied a coating of a 50% dioxane solution of a preformed reaction product of Example IX (the ethylene diamine product). To the surface of another block was applied a 50% dioxane solution of Epoxy Resin IV. Each block was allowed to dry, whereupon a film of the respective materials remained. The coated surfaces were then united and the joined blocks heated at 50° C. for 15 minutes. After cooling, it was found that the tensile strength of the cured resin line was 3000 pounds per square inch.

We claim as our invention:

1. A composition of matter comprising a glycidyl ether having a 1,2-epoxy equivalency greater than one in admixture with about 50% to 150% of an equal weight of a preformed reaction product of a glycidyl ether having a 1,2-epoxy equivalency greater than one with at least 90% of one molecular weight of hardening agent for each epoxy group of the ether initially present in the reaction mixture, said hardening agent containing a plurality of neutralizable hydrogen atoms and having a dissociation constant in 0.01 N aqueous solution at 20° C. greater than $10^{-6}$ and said glycidyl ethers being free of other functional groups than epoxy groups and alcoholic hydroxyl groups.

2. A composition of matter comprising a glycidyl ether of a dihydric phenol having a 1,2-epoxy equivalency greater than one in admixture with about 50% to 150% of an equal weight of a preformed reaction product of a glycidyl ether of a dihydric phenol having a 1,2-epoxy equivalency greater than one with at least 90% of one molecular weight of hardening agent for each epoxy group of the ether initially present in the reaction mixture, said hardening agent containing a plurality of neutralizable hydrogen atoms and having a dissociation constant in 0.01 N aqueous solution at 20° C. greater than $10^{-6}$ and said glycidyl ethers being free of other functional groups than epoxy groups and alcoholic hydroxyl groups.

3. A composition of matter comprising a glycidyl ether having a 1,2-epoxy equivalency greater than one in admixture with about 50% to 150% of an equal weight of a preformed reaction product of a glycidyl ether having a 1,2-epoxy equivalency greater than one with at least 90% of one molecular weight of an aliphatic diamine containing two primary amino groups for each epoxy group of the ether initially present in the reaction mixture, said glycidyl ethers being free of other functional groups than epoxy groups and alcoholic hydroxyl groups.

4. A composition of matter comprising a glycidyl ether of bis-(4-hydroxyphenyl)-2,2-propane having a 1,2-epoxy equivalency greater than one in admixture with about 50% to 150% of an equal weight of a preformed reaction product of a glycidyl ether of bis-(4-hydroxyphenyl)-2,2-propane having a 1,2-epoxy equivalency greater than one with at least 90% of one molecular weight of an aliphatic diamine containing two primary amino groups for each epoxy group of the ether initially present in the reaction mixture, said glycidyl ethers being free of other functional groups than epoxy groups and alcoholic hydroxyl groups.

5. A composition of matter comprising a glycidyl ether having a 1,2-epoxy equivalency greater than one in admixture with about 50% to 150% of an equal weight of a preformed reaction product of a glycidyl ether having a 1,2-epoxy equivalency greater than one with at least 90% of one molecular weight of a dicarboxylic acid for each epoxy group of the ether initially present in the reaction mixture, said glycidyl ethers being free of other functional groups than epoxy groups and alcoholic hydroxyl groups.

6. A composition of matter comprising a glycidyl ether of bis-(4-hydroxyphenyl)-2,2-propane having a 1,2-epoxy equivalency greater than one in admixture with about 50% to 150% of an equal weight of a preformed reaction product of a glycidyl ether of bis-(4-hydroxyphenyl)-2,2-propane having a 1,2-epoxy equivalency greater than one with at least 90% of one molecular weight of an aliphatic dicarboxylic acid for each epoxy group of the ether initially present in the reaction mixture, said glycidyl ethers being free of other functional groups than epoxy groups and alcoholic hydroxyl groups.

7. A composition of matter comprising a glycidyl ether having a 1,2-epoxy equivalency greater than one in admixture with about 50% to 150% of an equal weight of a preformed reaction product of a glycidyl ether having a 1,2-epoxy equivalency greater than one with at least 90% of one molecular weight of a phosphoric acid for each epoxy group of the ether initially present in the reaction mixture, said glycidyl ethers being free of other functional groups than epoxy groups and alcoholic hydroxyl groups.

8. A composition of matter comprising a glycidyl ether of bis-(4-hydroxyphenyl)-2,2-propane having a 1,2-epoxy equivalency greater than one in admixture with about 50% to 150% of an equal weight of a preformed reaction product of a glycidyl ether of bis-(4-hydroxyphenyl)-2,2-propane having a 1,2-epoxy equivalency greater than one with at least 90% of one molecular weight of a phosphoric acid for each epoxy group of the ether initially present in the reaction mixture, said glycidyl ethers being free of other functional groups than epoxy groups and alcoholic hydroxyl groups.

9. A composition of matter comprising a glycidyl ether of bis-(4-hydroxyphenyl)-2,2-propane having a 1,2-epoxy equivalency greater than one in admixture with about an equal weight of a preformed reaction product of a glycidyl ether of bis-(4-hydroxyphenyl)-2,2-propane having a 1,2-epoxy equivalency greater than one with about one molecular weight of ethylene diamine for each epoxy group of the ether initially present in the reaction mixture, said glycidyl ethers being free of other functional groups than epoxy groups and alcoholic hydroxyl groups.

10. A process for curing a glycidyl ether having a 1,2-epoxy equivalency greater than one to a resinous material, which comprises mixing and reacting said ether with 50% to 150% of an equal weight of a preformed reaction product of a glycidyl ether having a 1,2-epoxy equivalency greater than one with at least 90% of one molecular weight of hardening agent for each epoxy group of the ether initially present in the reaction mixture, said hardening agent containing a plurality of neutralizable hydrogen atoms and having a dissociation constant in 0.01 N aqueous solution at 20° C. greater than $10^{-6}$, said glycidyl ethers being free of other functional groups than epoxy groups and alcoholic hydroxyl groups.

11. A process for curing a glycidyl ether of a dihydric phenol having a 1,2-epoxy equivalency greater than one to a resinous material, which comprises mixing and thereafter heating at 50° C. to 250° C. said ether with 50% to 150% of an equal weight of a preformed reaction product of a glycidyl ether of a dihydric phenol having a 1,2-epoxy equivalency greater than one with at least 90% of one molecular weight of an aliphatic diamine containing two primary amino groups for each epoxy group of the ether initially present in the reaction mixture, said glycidyl ethers being free of other functional groups than epoxy groups and alcoholic hydroxyl groups.

12. A process for curing a glycidyl ether of bis-(4-hydroxyphenyl)-2,2-propane having a 1,2-epoxy equivalency greater than one to a resinous material, which comprises mixing and thereafter heating at 50° C. to 250° C. said ether with about an equal weight of a preformed reaction product of a glycidyl ether of bis-(4-hydroxyphenyl)-2,2-propane having a 1,2-epoxy equivalency greater than one with about one molecular weight of ethylene diamine for each epoxy group of the ether initially present in the reaction mixture, said glycidyl ethers being free of other functional groups than epoxy groups and alcoholic hydroxyl groups.

13. A process for curving a glycidyl ether of a dihydric phenol having a 1,2-epoxy equivalency greater than one to a resinous material, which comprises mixing and thereafter heating at 50° C. to 250° C. said ether with 50% to 150% of an equal weight of a preformed reaction product of a glycidyl ether of a dihydric phenol having a 1,2-epoxy equivalency greater than one with at least 90% of one molecular weight of a dicarboxylic acid for each epoxy group of the ether initially present in the reaction mixture, said glycidyl ethers being free of other functional groups than epoxy groups and alcoholic hydroxyl groups.

14. A process for curing a glycidyl ether of a dihydric phenol having a 1,2-epoxy equivalency greater than one to a resinous material, which comprises mixing and thereafter heating at 50° C. to 250° C. said ether with 50% to 150% of an equal weight of a preformed reaction product of a glycidyl ether of a dihydric phenol having a 1,2-epoxy equivalency greater than one with at least 90% of one molecular weight of a phosphoric acid for each epoxy group of the ether initially present in the reaction mixture, said glycidyl ethers being free of other functional groups than epoxy groups and alcoholic hydroxyl groups.

15. A process for curing a glycidyl ether of bis-(4-hydroxyphenyl)-2,2-propane having a 1,2-epoxy equivalency greater than one to a resinous material, which comprises mixing and thereafter heating at 50° C. to 250° C. said ether with about an equal weight of a preformed reaction product of a glycidyl ether of bis-(4-hydroxyphenyl)-2,2-propane having a 1,2-epoxy equivalency greater than one with about one molecular weight of phosphoric acid for each epoxy group of the ether initially present in the reaction mixture, said glycidyl ethers being free of other functional groups than epoxy groups and alcoholic hydroxyl groups.

16. A process which comprises coating a solid surface with a glycidyl ether of a dihydric phenol having a 1,2-epoxy equivalency greater than one and also coating another solid surface with a preformed reaction product of a glycidyl ether of a dihydric phenol having a 1,2-epoxy equivalency greater than one with at least 90% of one molecular weight of hardening agent for each epoxy group of the ether initially present in the reaction mixture, said hardening agent containing a plurality of neutralizable hydrogen atoms and having a dissociation constant in 0.01 N aqueous solution at 20° C. greater than $10^{-6}$, said glycidyl ethers being free of other functional groups than epoxy groups and alcoholic hydroxyl groups, bringing the two coated surfaces into contact with one another, and heating while in contact for a time sufficient to form a cured resinous bond between the surfaces.

17. A process which comprises coating a solid surface with a glycidyl ether of bis-(4-hydroxyphenyl)-2,2-propane having an epoxy equivalency greater than one and also coating another solid surface with a preformed reaction product of a glycidyl ether of bis-(4-hydroxyphenyl)-2,2-propane having a 1,2-epoxy equivalency greater than one with at least 90% of one molecular weight of ethylene diamine for each epoxy group of the ether initially present in the reaction mixture, said glycidyl ethers being free of other functional groups than epoxy groups and alcoholic hydroxyl groups, bringing the two coated surfaces into contact with one another and heating while in contact for a time sufficient to form a cured resinous bond between the surfaces.

18. A composition of matter comprising a glycidyl ether having a 1,2-epoxy equivalency greater than one in admixture with about 50% to 150% of an equal weight of a preformed reaction product of a glycidyl ether having a 1,2-epoxy equivalent greater than one with at least 90% of one molecular weight of a phenylene diamine for each epoxy group of the ether initially present in the reaction mixture, said glycidyl ethers being free of other functional groups than epoxy groups and alcoholic hydroxyl groups.

19. A composition of matter comprising a glycidyl ether of bis-(4-hydroxyphenyl)-2,2-propane having a 1,2-epoxy equivalency greater than one in admixture with about 50% to 150% of an equal weight of a preformed reaction product of a glycidyl ether of bis-(4-hydroxyphenyl)-2,2-propane having a 1,2-epoxy equivalency greater than one with at least 90% of one molecular weight of a phenylene diamine for each epoxy group of the ether initially present in the reaction mixture, said glycidyl ethers being free of other functional groups than epoxy groups and alcoholic hydroxyl groups.

20. A process for curing a glycidyl ether of a dihydric phenol having a 1,2-epoxy equivalency greater than one to a resinous material, which comprises mixing and thereafter heating at 50° C. to 250° C. said ether with 50% to 150% of an equal weight of a preformed reaction product of a glycidyl ether of a dihydric phenol having a 1,2-epoxy equivalency greater than one with at least 90% of one molecular weight of a phenylene diamine for each epoxy group of the ether initially present in the reaction mixture, said glycidyl ethers being free of other functional groups than epoxy groups and alcoholic hydroxyl groups.

21. A process for curing a glycidyl ether of bis-(4-hydroxyphenyl)-2,2-propane having a 1,2-epoxy equivalency greater than one to a resinous material, which comprises mixing and thereafter heating at 50° C. to 250° C. said ether with about an equal weight of a preformed reaction product of a glycidyl ether of bis-(4-hydroxyphenyl)-2,2-propane having a 1,2-epoxy equivalency greater than one with about one molecular weight of phenylene diamine for each epoxy group of the ether initially present in the reaction mixture, said glycidyl ethers being free of other functional groups than epoxy groups and alcoholic hydroxyl groups.

EDWARD C. SHOKAL.
HERBERT A. NEWEY.
THEODORE F. BRADLEY.

References Cited in the file of this patent

UNITED STATES PATENTS

| Number | Name | Date |
|---|---|---|
| 2,199,597 | Renfrew | May 7, 1940 |
| 2,268,611 | Mitchell | Jan. 6, 1942 |
| 2,448,357 | Craig | Aug. 31, 1948 |
| 2,500,600 | Bradley | Mar. 14, 1950 |
| 2,528,932 | Wiles et al. | Nov. 7, 1950 |
| 2,541,027 | Bradley | Feb. 13, 1951 |
| 2,557,826 | Keaton et al. | June 19, 1951 |
| 2,569,920 | Buck et al. | Oct. 2, 1951 |
| 2,575,558 | Newey et al. | Nov. 20, 1951 |

FOREIGN PATENTS

| Number | Country | Date |
|---|---|---|
| 251,647 | Switzerland | Sept. 1, 1948 |